United States Patent [19]
Uriya

[11] Patent Number: 5,608,793
[45] Date of Patent: Mar. 4, 1997

[54] SPEECH CONTROL APPARATUS USED IN A FOLDING TELEPHONE

[75] Inventor: Susumu Uriya, Tokyo, Japan

[73] Assignee: NEC Corporation, Tokyo, Japan

[21] Appl. No.: 493,219

[22] Filed: Jun. 20, 1995

[30] Foreign Application Priority Data

Jun. 21, 1994 [JP] Japan ................................. 6-138495

[51] Int. Cl.⁶ ............................................ H04M 1/00
[52] U.S. Cl. ..................... 379/387; 379/433; 379/406; 379/410; 381/107; 381/109
[58] Field of Search ...................... 379/387, 406, 379/407, 410, 433, 434; 381/107, 109, 111, 112, 114, 115

[56] References Cited

U.S. PATENT DOCUMENTS

| | | | |
|---|---|---|---|
| 5,048,091 | 9/1991 | Sato et al. ............................... | 381/107 |
| 5,341,420 | 8/1994 | Hollier et al. ........................... | 379/434 |
| 5,436,954 | 7/1995 | Nishiyama et al. ..................... | 379/433 |
| 5,440,629 | 8/1995 | Gray ........................................ | 379/433 |
| 5,463,687 | 10/1995 | Takizawa ................................ | 379/433 |

FOREIGN PATENT DOCUMENTS 1212052  8/1989  Japan .

Primary Examiner—Thomas W. Brown
Assistant Examiner—Jacques M. Saint-Surin
Attorney, Agent, or Firm—Whitham, Curtis, Whitham & McGinn

[57] ABSTRACT

In a speech control apparatus used in a folding telephone, a rotary switch detects the rotating angle of the hinge of the folding telephone and delivers a control signal indicative of the hinge rotating angle to a speech controller. The speech controller controls the level of the speech signal from a microphone. The speech controller suppresses the noise included in the speech signal based on the control signal. The speech controller suppresses the echo included in the speech signal by generating an echo replica in accordance with the control signal and a radio signal from the communication partner.

5 Claims, 9 Drawing Sheets

5,608,793

SPEECH CONTROL APPARATUS USED IN A FOLDING TELEPHONE

BACKGROUND OF THE INVENTION

The present invention relates to a speech control apparatus, and more particularly to a speech control apparatus used in a folding telephone.

A conventional folding telephone, which is intended for the enhanced usefulness of portability, includes an upper casing, a lower casing and a hinge. A bottom end of the upper casing is connected to the lower casing by the hinge so that the portable telephone is foldable. When the telephone is used, the upper casing is swung out at the hinge against the lower casing. Otherwise, when the telephone is not used, the upper casing is folded to meet the lower casing so that it is compact and the user can easily carry it.

The folding telephone is designed to have its rotating angle between the upper and lower casings, i.e., the hinge rotating angle, made variable, thus, the speaker in the upper casing and the microphone in the lower casing are located properly at the ear and mouth of the user.

A folding telephone of this kind with the ability of preventing the phenomenon of howling is disclosed in for example, Japanese Laid-open Patent Application No. Heisei 1-212052.

The telephone has a main casing including a speaker, and an arm section including a microphone. The telephone is designed such that when the arm section is swung out by the user to start a communication, the microphone is kept inactive until the arm section has a certain rotating angle with the main casing so that the occurrence of howling which is the leakage of the sound from the speaker into the microphone is prevented.

However, if the user varies the rotating angle between the main casing and arm section during the communication, causing the positional relationship between the user's mouth and the microphone in the arm section to vary, the user's voice level sensed by the microphone will vary. Consequently, the magnitude of the audio signal sent to the telephone of the communication partner will vary, and the partner will hear unfavorably the voice with an abruptly varying level.

Moreover, this telephone is sometimes deficient in the avoidance of a sound leakage from the speaker into the microphone, in which case the partner's voice is unfavorably sent back through the user's microphone as an echo to the partner's telephone.

There is known an echo canceller equipped in a usual telephone. The echo canceller generates an echo replica by estimating the echo path which is the path of sound from the speaker to the microphone on the telephone, and subtracts the echo replica from the speech sensed by the microphone so as to offset the echo.

However, the echo canceller of this type has not been adopted by folding telephone. Even if a folding telephone is equipped with this echo canceller, the echo path cannot be estimated accurately due to the quick variation of the hinge rotating angle, and therefore an accurate echo replica cannot be produced for the cancellation of echo.

SUMMARY OF THE INVENTION

An object of the present invention is to provide a speech control apparatus used in a folding telephone capable of preventing the variation in a speech level.

Another object of the present invention is to provide a speech control apparatus capable of surely suppressing the noise included in the speech.

Still another object of the present invention is to provide a speech control apparatus capable of accurately estimating the echo path.

The speech control apparatus of the present invention includes an upper casing, a lower casing in which a microphone is fitted and a hinge, includes a control signal generator which detects the rotating angle of the hinge and produces a control signal indicative of the hinge rotating angle. The present invention further includes a speech level controller which controls the speech level sent to communication partner and produces a level-controlled speech signal, and a transmitter which transmits the level-controlled speech signal to the telephone of the communication partner.

The present invention also includes a noise suppressor which suppresses the noise included in the speech based on the control signal, and produces a noise-suppressed speech signal.

The present invention still further includes a receiver which receives a radio signal which carries the speech signal sent from the telephone of the communication partner and produces a reception signal, and an echo suppressor which suppresses an echo included in the speech sent to communication partner based on the control signal and the reception signal, and produces an echo-cancelled speech signal.

Based on the foregoing arrangement, the present invention detects the hinge rotating angle between the upper casing and lower casing of the folding telephone thereby to produce a control signal indicative of the hinge rotating angle, and controls of the speech level sent and suppresses the noise or echo based on the control signal.

DETAILED DESCRIPTION OF THE PREFERRED EMBODIMENTS

Figure 1C:
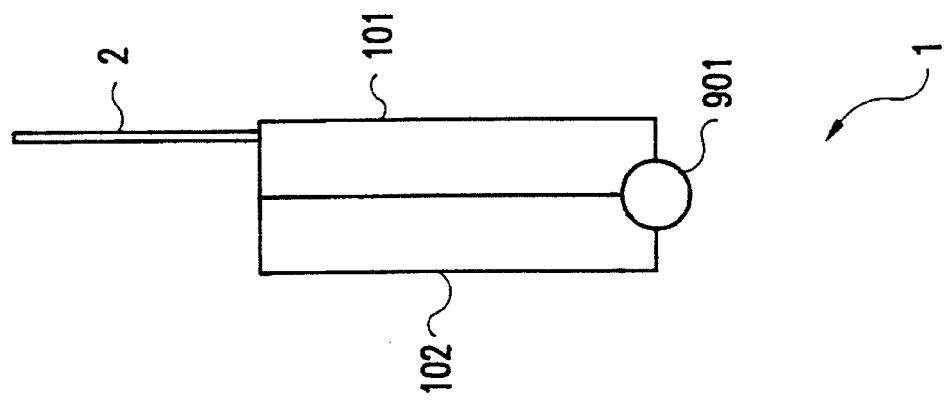
FIGS. 1A, 1B and 1C are side views of the folding telephone of an embodiment according to the present invention.
Figure 1B:
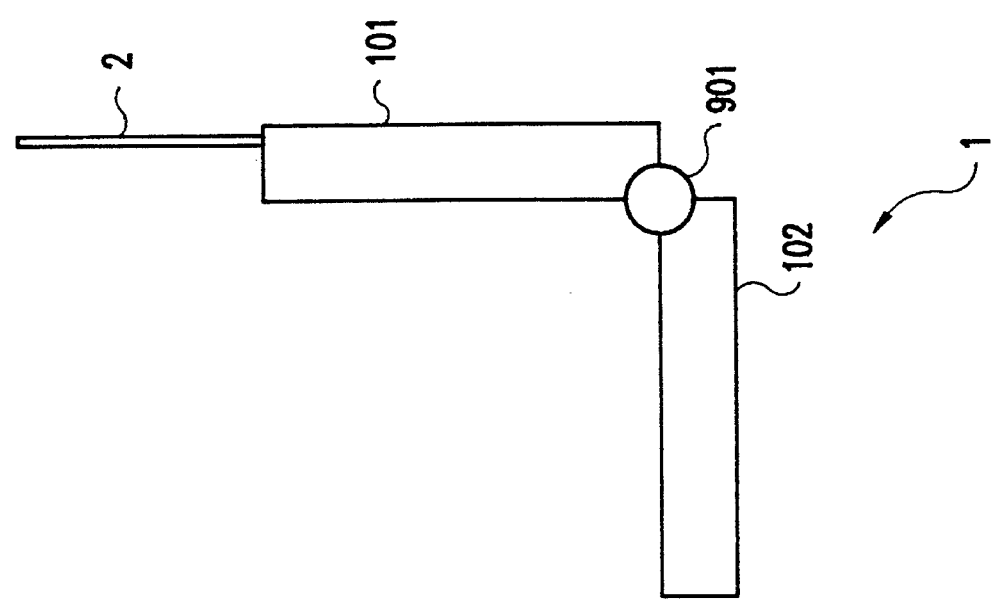
Figure 1A:
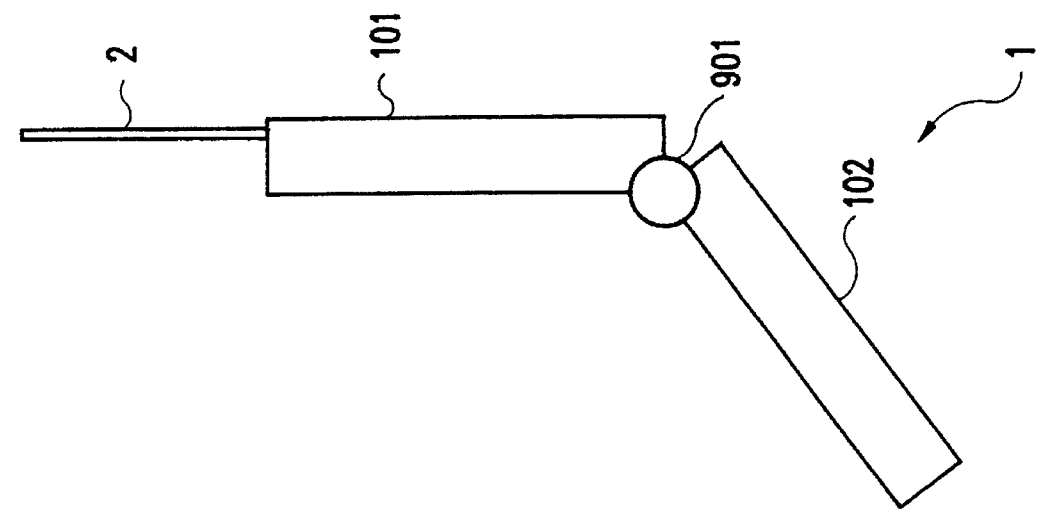

Referring to FIGS. 1A, 1B and 1C, the folding telephone 1 includes an antenna 2, an upper casing 101, a lower casing 102, and a hinge 901. Shown by FIGS. 1A and 1B are the states of the upper casing 101 which is swung out at the hinge 901 against the lower casing 102. The rotating angle between the upper casing 101 and lower casing 102, i.e., the rotating angle of the hinge 901, can be varied during communication. Shown by FIG. 1C is the state of the upper casing 101 which is folded to meet the lower casing 102.

Figure 2:
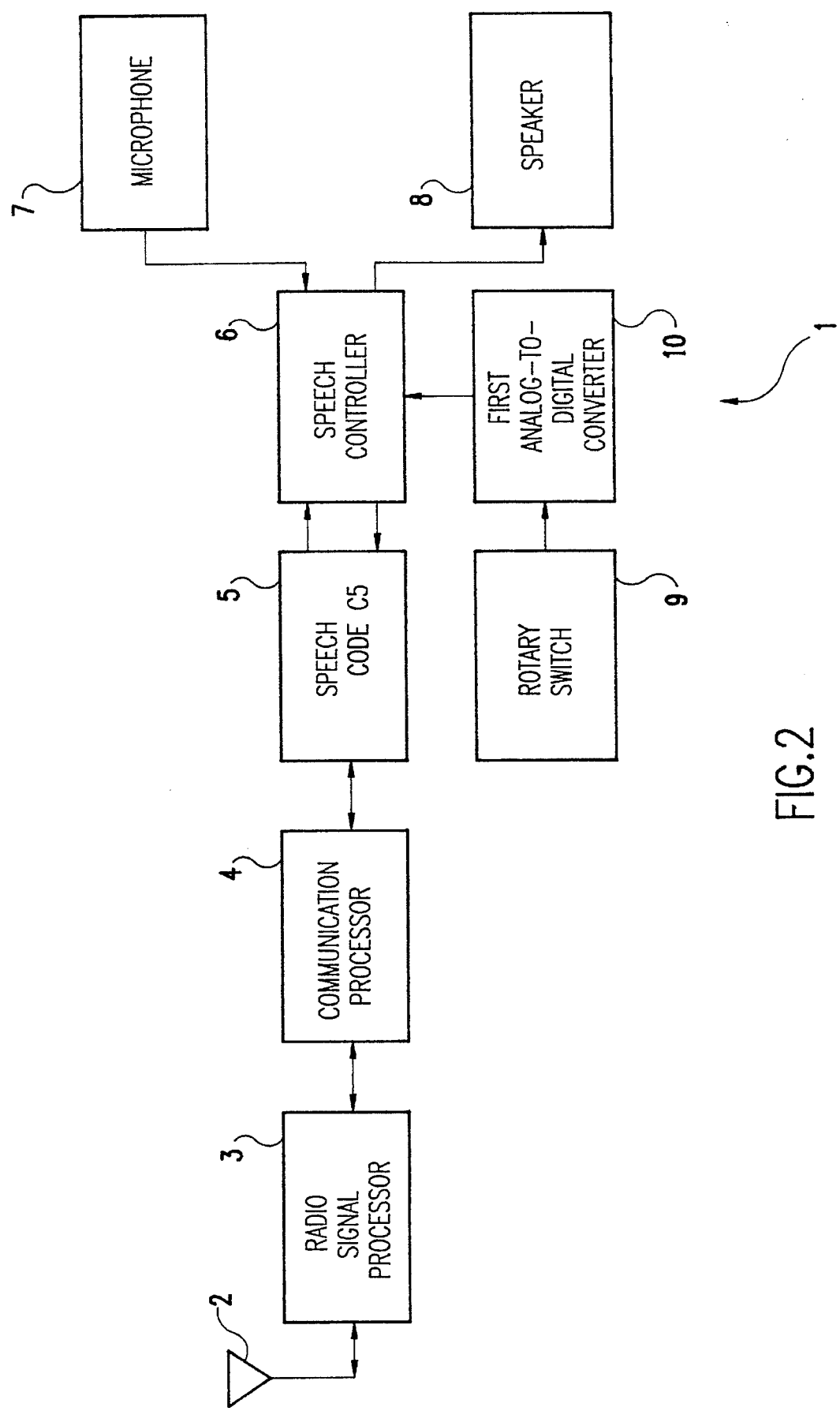
FIG. 2 is a block diagram of the folding telephone shown in FIG. 1.

Referring to FIG. 2, the folding telephone 1 incorporates a radio signal processor 3, a communication processor 4, a speech codec 5, a speech controller 6, a microphone 7, a speaker 8, a rotary switch 9, and a first analog-to-digital (A/D) converter 10. The rotary switch 9 is fitted in the hinge 901.

The antenna 2 receives a first radio signal from the base station (not shown) and feeds the received signal to the radio signal processor 3. The processor 3 demodulates the radio signal from the antenna 2 and delivers the demodulated signal to the communication processor 4. The processor 4 decodes the demodulated signal from the processor 3 and delivers the decoded signal to the speech codec 5. The codec 5 implements the redundancy coding for the decoded signal from the processor 4 and supplies the redundancy-coded speech signal to the speech controller 6. The controller 6 converts the redundancy-coded speech signal from the codec 5 into a first analog speech signal and delivers the first analog speech signal to the speaker 8, which transduces the first analog voice signal into the speech.

The microphone 7 transduces the user's speech into a second analog speech signal and delivers the second analog speech signal to the speech controller 6. The controller 6 converts the second analog speech signal from the microphone 7 into a digital signal. The controller 6 controls the speech level based on the control signal from the first A/D converter 10 and delivers the level-controlled digital speech signal to the speech codec 5. The codec 5 implements the compression encoding for the level-controlled digital speech signal from the controller 6 and delivers the compressed speech code signal to the communication processor 4. The processor 4 implements the time-division multi-access processing for the compressed speech code signal from the codec 5 and delivers the digital signal to the radio signal processor 3. The processor 3 modulates and amplifies the digital signal from the processor 4 and feeds the modulated signal to the antenna 2. The antenna 2 transmits the modulated signal from the processor 3 as a second radio signal to the base station (not shown).

The rotary switch 9 detects the rotating angle of the hinge 901 and delivers the hinge rotating angle signal to the first A/D converter 10, which converts the hinge angle signal from the rotary switch 9 into a control signal and delivers it to the voice controller 6.

Figure 3:
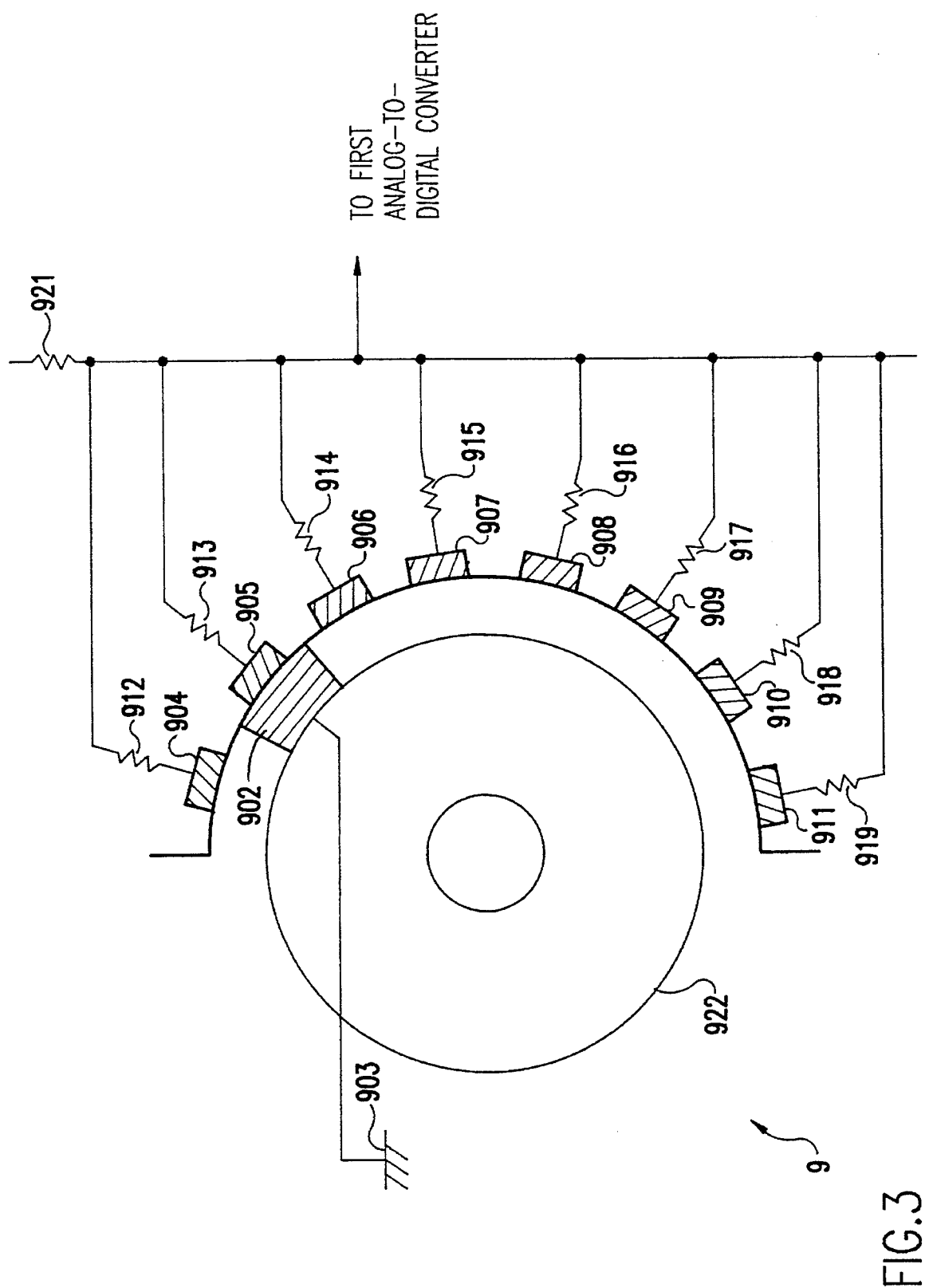
FIG. 3 is a schematic diagram of the rotary switch shown in FIG. 2.

Referring to FIG. 3, the rotary switch 9 has a rotor 922, which has a moving (e.g., movable) contact 902 connected to the ground terminal 903. The rotor 922 shares the shaft with the hinge 901 shown in FIGS. 1A–1C, and it is turned by the swing motion of the hinge 901. The rotary switch 9 further includes eight fixed contacts 904–911, one of which comes in contact with the moving contact 902 at a time, eight resistors 912–919 having different resistance values and having one ends connected with the fixed contacts 904–911, respectively, a resistor 921 which is connected at one end commonly to other ends of the resistors 912–919, and a power supply terminal 920 which is connected to another end of the resistor 921 and supplied with a reference voltage Vcc.

When the hinge 901 swings, the moving contact 902 on the rotor 922 turns and comes into contact with another of the fixed contacts 904–911. Consequently, the voltage on the common ends of the resistors 912–919, which is delivered to the first A/D converter 10, varies depending on the hinge rotating angle due to the different resistance values of the resistors 912–911. Namely, the rotary switch 9 produces a voltage which is the reference voltage Vcc subtracted by the voltage drop across a resistor associated with a fixed contact in connection with the moving contact 902, and delivers the voltage as the hinge rotating angle signal indicative of the rotating angle of the hinge 901 to the first A/D converter 10.

Although the rotary switch 9 is employed in this embodiment for detecting the rotating angle of the hinge 901, the present invention is not confined to the use of this device, but any other means of detecting the hinge rotating angle may be used.

Figure 4:
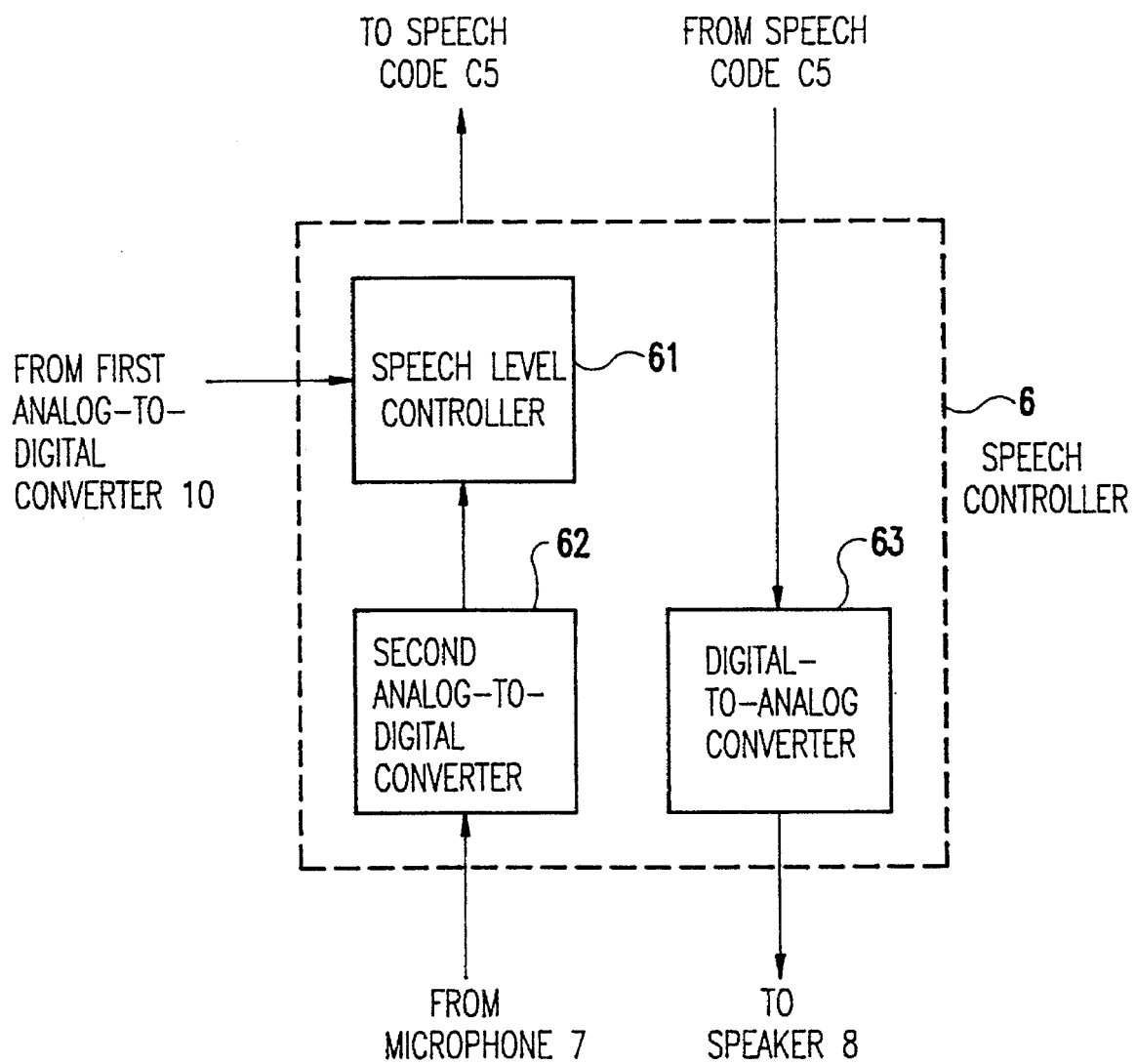
FIG. 4 is a block diagram of the speech controller shown in FIG. 2.

Referring to FIG. 4, the speech controller 6 includes a speech level controller 61, a second A/D converter 62 and a digital-to-analog (D/A) converter 63.

The D/A converter 63 converts the redundancy-coded speech signal from the voice codec 5 into a first analog speech signal and feeds the resulting first analog speech signal to the speaker 8. The second A/D converter 62 converts the second analog speech signal from the microphone 7 into a digital speech signal and delivers the digital speech signal to the speech level controller 61. The controller 61 implements the speech level control for the digital speech signal from the second A/D converter 63 based on the control signal from the first A/D 10 and delivers the level-controlled digital speech signal to the speech codec 5.

Figure 5:
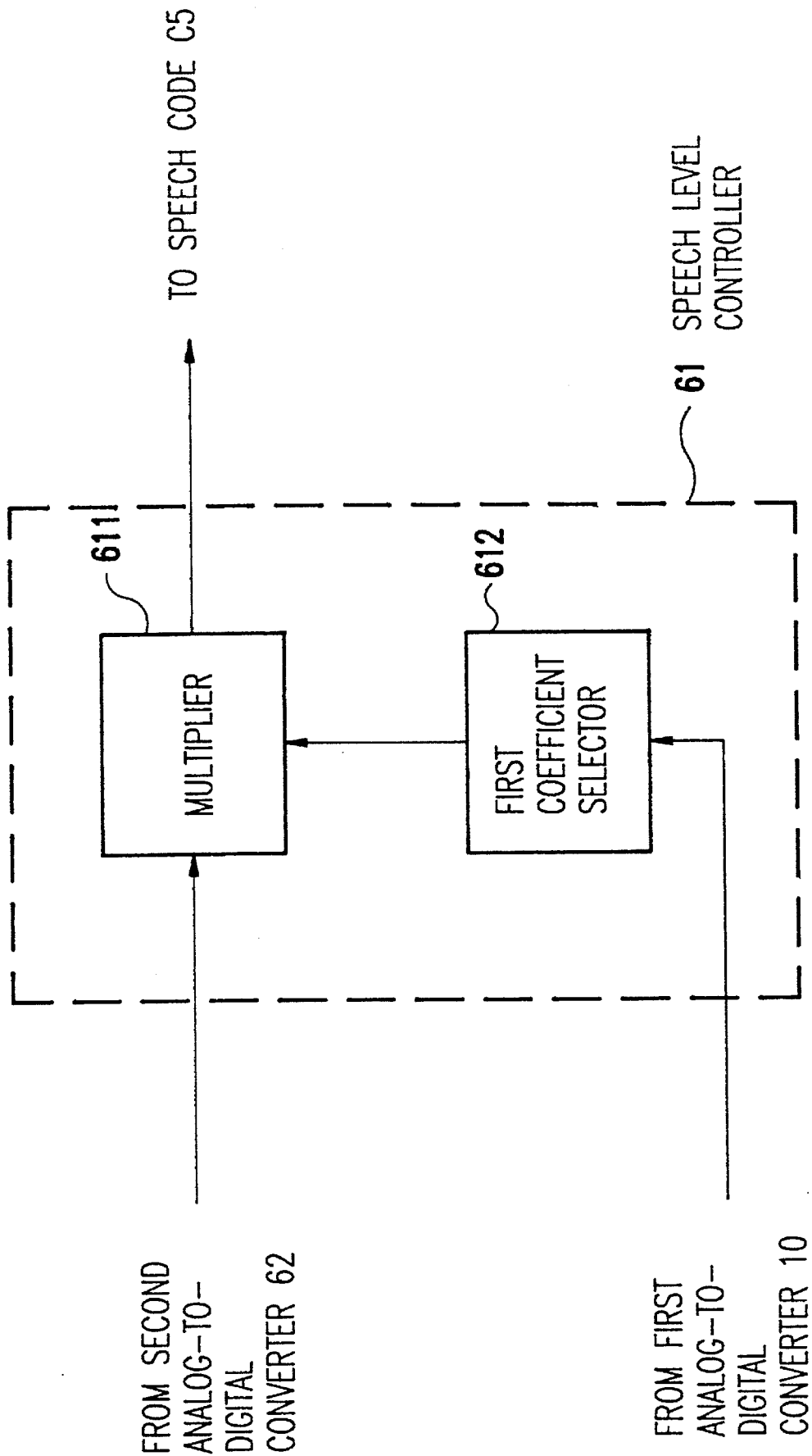
FIG. 5 is a block diagram of the speech level controller shown in FIG. 4.

Referring to FIG. 5, the speech level controller 61 includes a multiplier 611 and a first coefficient selector 612. The first coefficient selector 612 includes a PROM which stores coefficients $\beta$ used to control the level of digital speech signal from the second A/D converter 62.

The first coefficient selector 612 receives the control signal from the first A/D converter 10 as the addressing signal, and reads out an addressed coefficient $\beta$ to the multiplier 611. The coefficient $\beta$ is a speech level controlling factor which is proportional to the rotating angle of the hinge 901. The multiplier 611 multiplies the coefficient $\beta$ to the digital speech signal from the second A/D converter 62 and delivers the resulting level-controlled digital speech signal to the speech codec 5.

Accordingly, the digital speech signal, i.e., speech sent to communication partner, has its level controlled in proportion to the rotating angle of the hinge 901.

Figure 6:
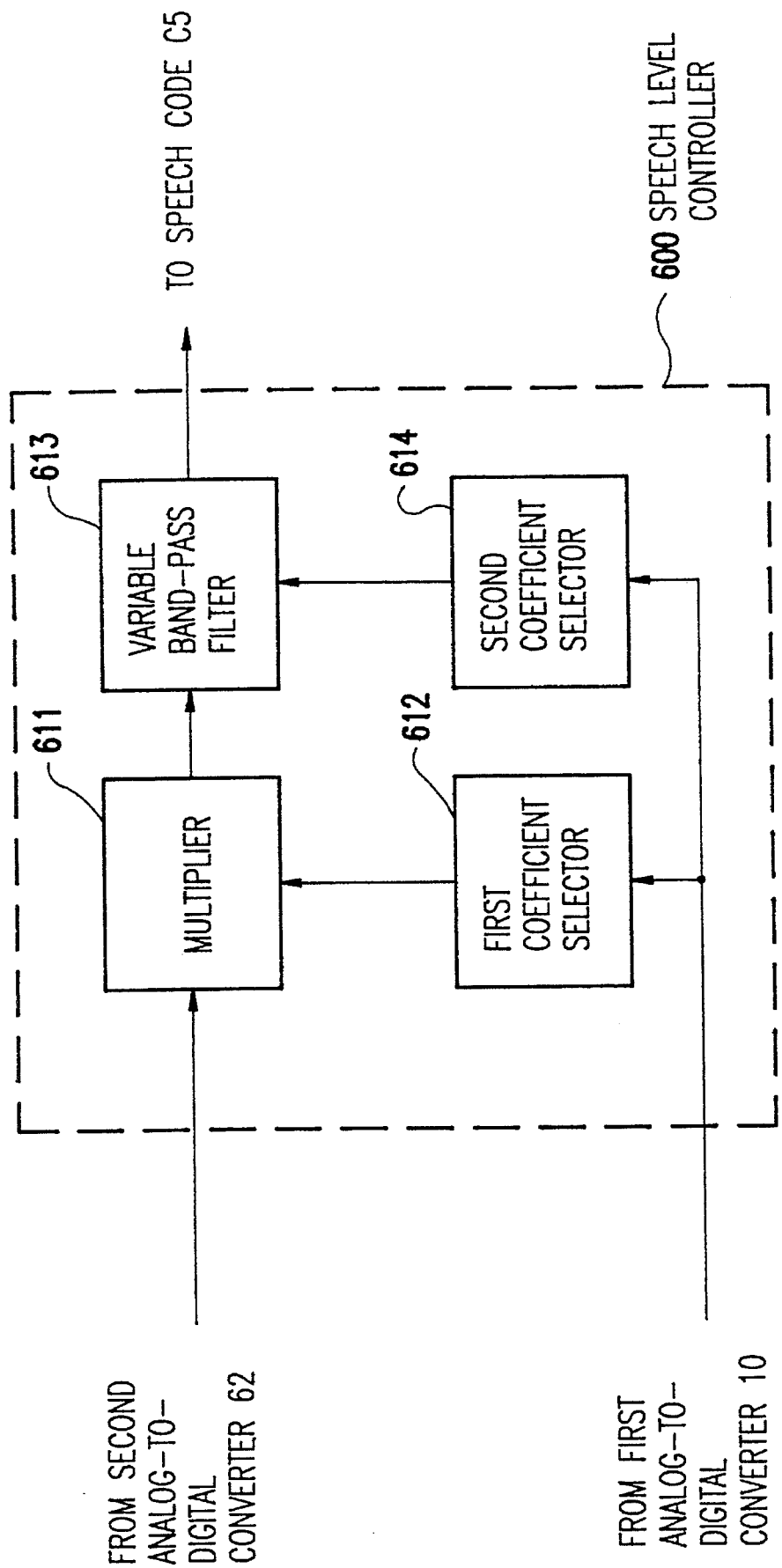
FIG. 6 is a block diagram showing another embodiment of the speech level controller shown in FIG. 4.

Referring to FIG. 6 showing another embodiment of the speech level controller, the speech level controller 600 includes a multiplier 611, a first coefficient selector 612, a variable band-pass filter 613, and a second coefficient selector 614. The selector 614 consists of a PROM which stores coefficients $\gamma$ used to suppress the noise included in the level-controlled digital speech signal from the multiplier 611. The multiplier 611 and selector 612 have the same arrangement and operation as explained in connection with FIG. 5.

The selector 614 receives the control signal from the first A/D converter 10 as the addressing signal, and reads out an addressed coefficient $\gamma$ to the variable band-pass filter 613. The coefficient $\gamma$ is a bandwidth altering factor which is inversely proportional to the rotating angle of the hinge 901. The variable band-pass filter 613, which alters the bandwidth in accordance with the coefficient $\gamma$, suppresses the noise included in the level-controlled digital speech signal from the multiplier 611 and delivers the noise-suppressed digital speech signal to the voice codec 5.

Accordingly, the variable band-pass filter 613 has its bandwidth narrowed in response to the increase in the rotating angle of the hinge 901, which signifies the increase in the distance between the microphone 7 in the lower casing of the folding telephone and the mouth of the user and thus the increase in the noise level of the digital speech signal, i.e., the voice sent to communication partner from the microphone 7, and consequently the noise is surely suppressed.

Figure 7:
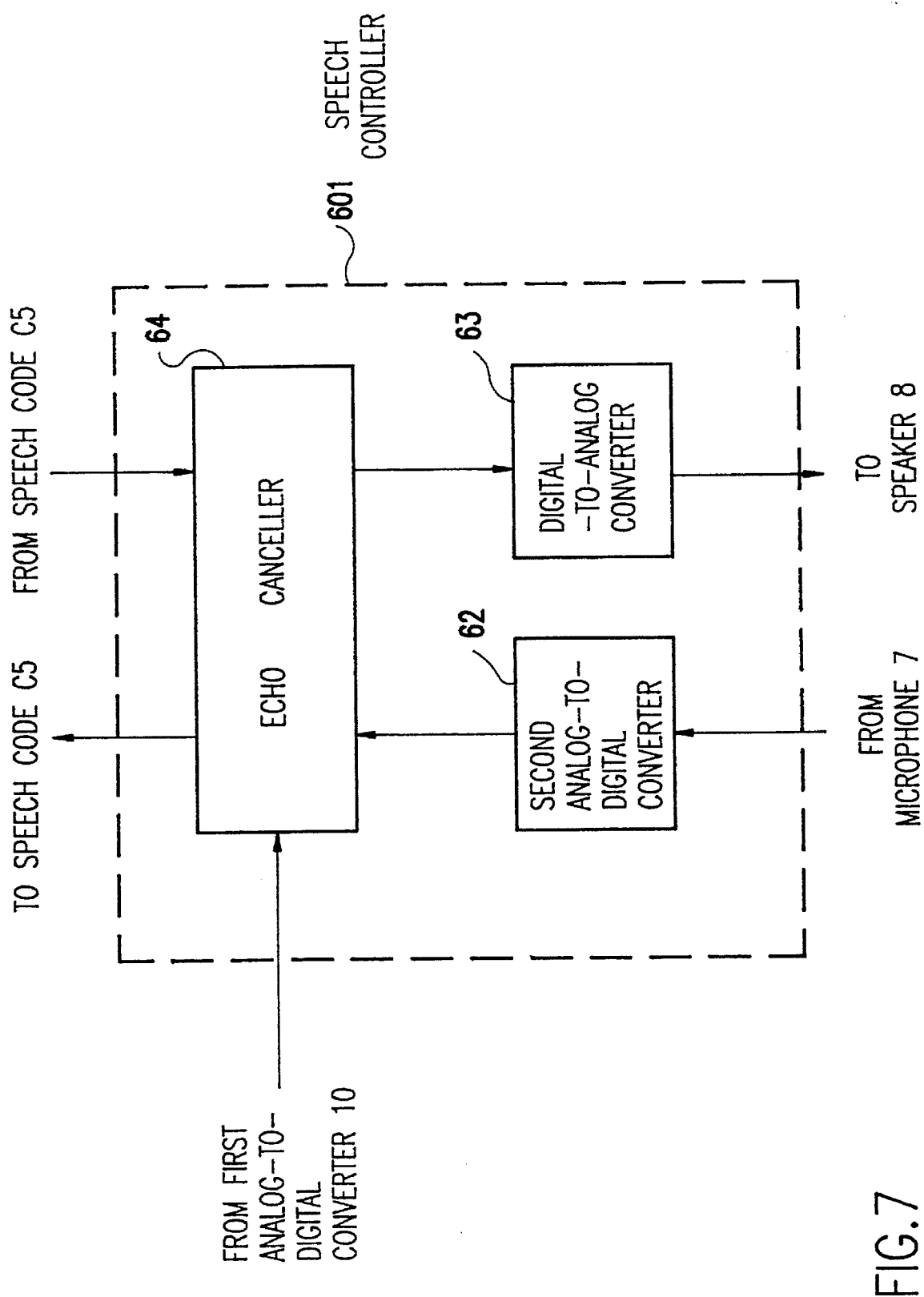
FIG. 7 is a block diagram showing another embodiment of the speech controller shown in FIG. 2.

Referring to FIG. 7 showing another embodiment of the speech controller, the speech controller 601 includes a second A/D converter 62, a D/A converter 63, and an echo canceller 64. The converter 62 and 63 have the same arrangement and operation as explained in connection with FIG. 4. The echo controller 64 suppresses the echo included in the digital signal from the converter 62 in accordance with the control signal from the first A/D converter 10 and the redundancy-coded speech signal from the speech codec 5.

Figure 8:
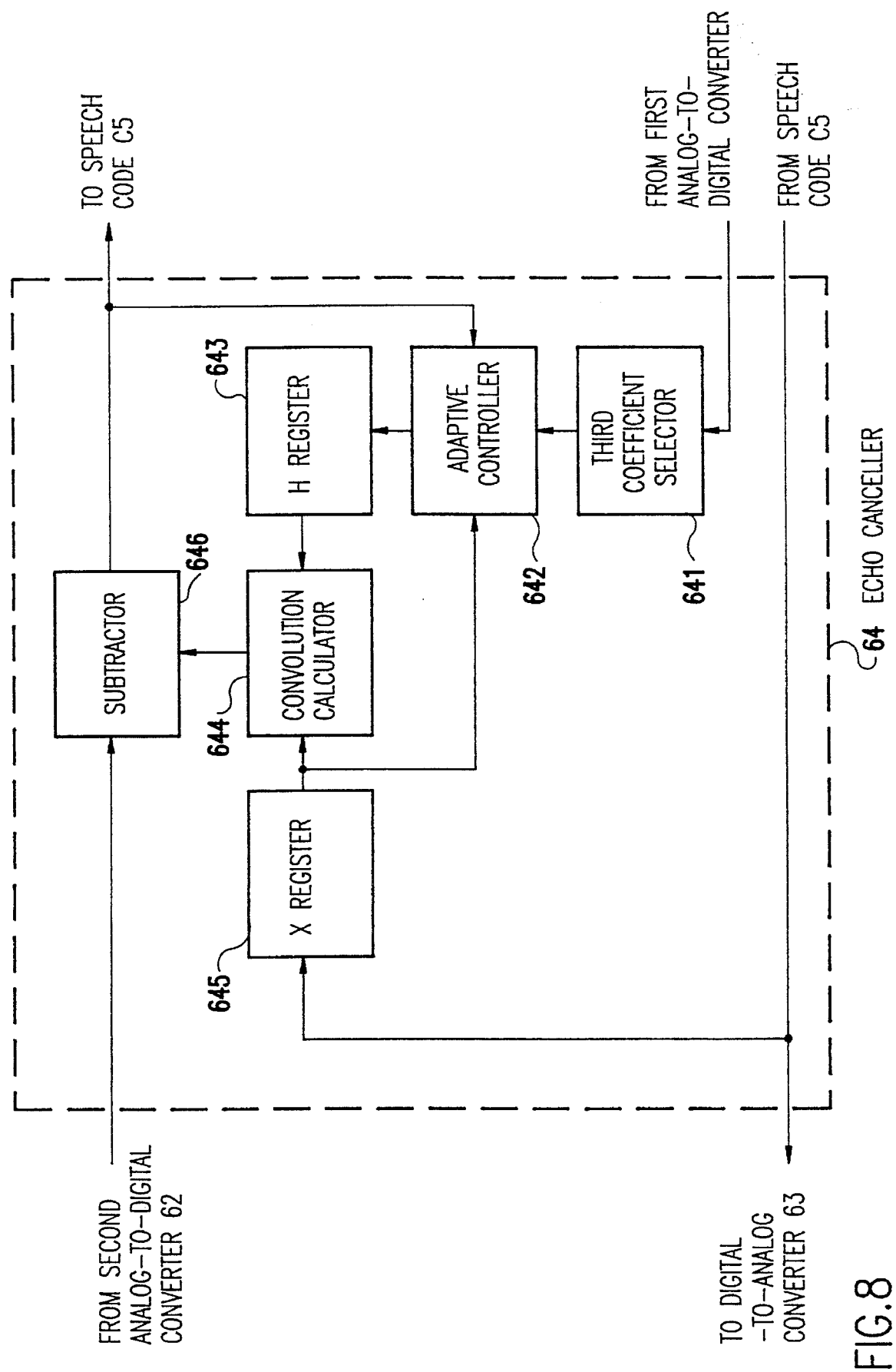
FIG. 8 is a block diagram of the echo canceller shown in FIG. 7.

Referring to FIG. 8, the echo canceller 64 includes a third coefficient selector 641, an adaptive controller 642, an H register 643, a convolution calculator 644, an X register 645, and a subtracter 646. The third coefficient selector 641 includes a PROM which stores a factor $\alpha$ used to calculate the modification value $\Delta H_j$ of the impulse response signal for the estimated echo path which will be explained later.

The coefficient selector 641 receives the control signal from the first A/D converter 10 as the addressing signal, and reads out an addressed factor $\alpha$ to the adaptive controller 642. The factor $\alpha$ is an echo path tracing factor which is inversely proportional to the rotating angle of the hinge 901.

The X register 645 receives the redundancy-coded speech signal from the speech codec 5 as the addressing signal, and delivers a sampled speech signal $X_j$ of N-degree vector at time point j to the convolution calculator 644 and adaptive controller 642. The adaptive controller 642 produces a modification value $\Delta H_j$ based on the following formula (1) for the error signal ej from the subtracter 646 and the sampled speech signal $X_j$ from the X register 645, and delivers the modification value $\Delta H_j$ to the H register 643.

$$\Delta H_j = \alpha (X_j / \Sigma X_j \cdot X_{jt}) e_j \qquad (1)$$

where $X_{jt}$ is the transposed matrix of the vector $X_j$.

The H register 643 adjusts the impulse response signal $H_{j-1}$ of the estimated echo path, which is an N-degree vector at time point j-1, based on the following formula (2) for the modification value $\Delta H_j$ from the adaptive controller 642, and delivers the resulting coefficient $H_j$ at time point j to the convolution calculating circuit 644.

$$H_j = H_{j-1} + \Delta H_j \qquad (2)$$

The convolution calculator 644 produces an echo replica $Y'_j$ based on the following formula (3) for the sampled speech signal $X_j$ from the X register 645 and the coefficient $H_j$ from the H register 643, and delivers the echo replica $Y'_j$ to the subtracter 646.

$$Y'_j = \Sigma X_j \cdot H_{jt} \qquad (3)$$

where $H_{jt}$ is the transposed matrix of the vector $H_j$.

The subtracting circuit 646 subtracts the echo replica $Y'_j$ from the convolution calculator 644 from the digital speech signal $Y_j$ at time point j provided by the second A/D converter 62 based on the following formula (4), and delivers the resulting echo-cancelled digital speech signal to the speech codec 5.

$$e_j = Y_j - Y'_j \qquad (4)$$

where $Y_j$ is the digital speech signal.

The digital speech signal $Y_j$ is also delivered as the error signal $e_j$ to the adaptive controller 642.

The echo canceller 64 carries out the foregoing calculations repeatedly, and the echo included in the digital speech signal, i.e., speech sent to communication partner from the second A/D converter 62 is surely cancelled. Accordingly, even if the rotating angle of the hinge 901 varies, it is possible to cancel the echo by varying the factor $\alpha$ in response to the hinge rotating angle.

Figure 9:
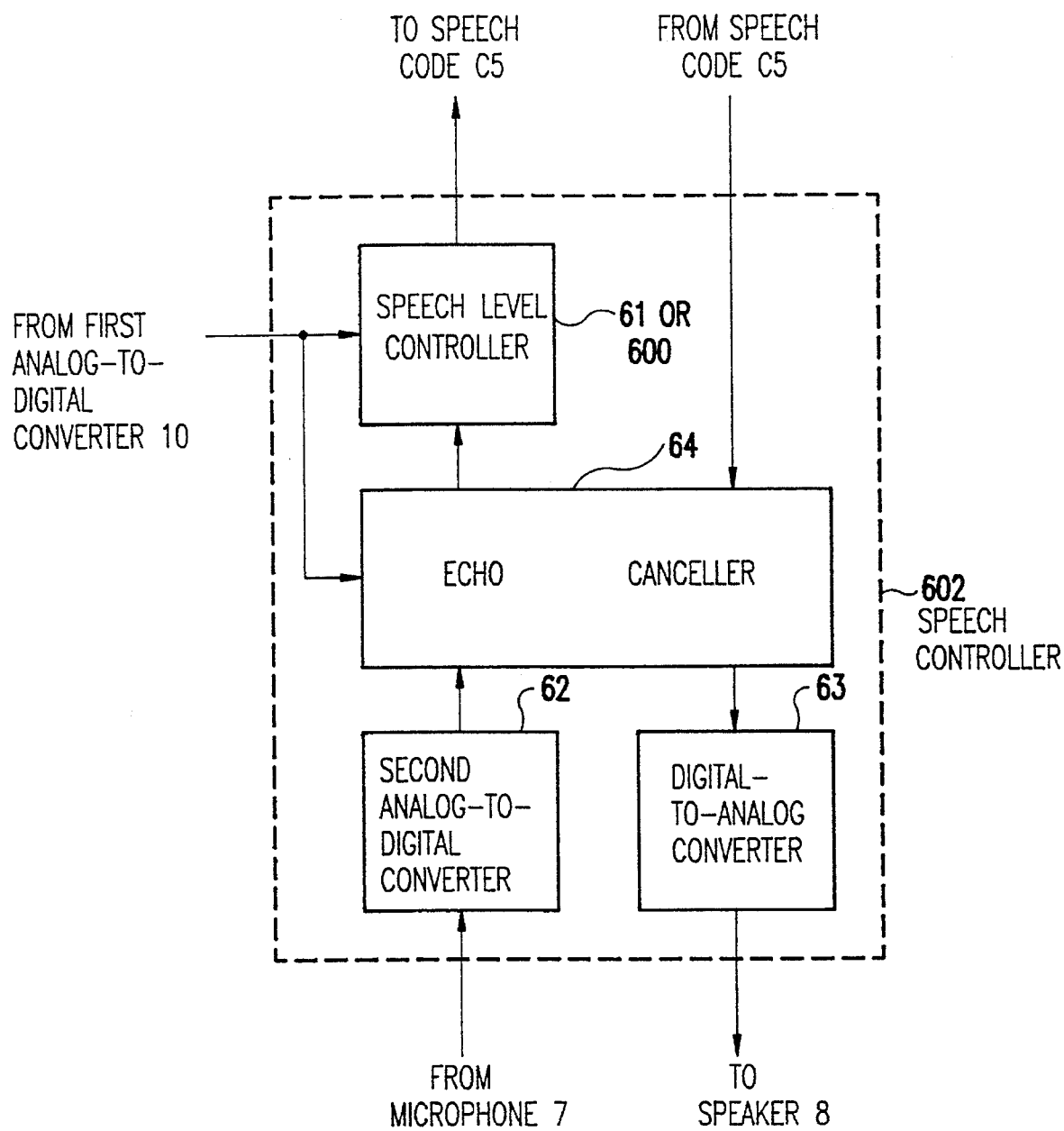
FIG. 9 is a block diagram showing still another embodiment of the speech controller shown in FIG. 2.

Referring to FIG. 9 showing still another embodiment of the speech controller, the speech controller 602 includes a speech level controller 61 or 600, a second A/D converter 62, an echo canceller 64, and a D/A converter 63. These functional circuits have the same arrangement and operation as explained above, and the explanation thereof is omitted.

According to this invention, as described above, the speech level control, noise suppression and echo replica generation take place in accordance with the control signal which responds to the detected rotating angle of the hinge 901, and consequently the voice sent to communication partner can be stabilized against the variation in the speech level, noise level and echo path caused by the variation of the hinge rotating angle.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A speech control apparatus having an upper casing, a lower casing and a hinge, said control apparatus comprising:

a microphone, disposed in said lower casing, for converting a user's speech into a speech signal;

control signal generation means for detecting a rotating angle of said hinge, and for producing a control signal indicative of the hinge rotating angle;

speech level control means for controlling, in accordance with said control signal, a level of said speech signal, and for outputting a level-controlled speech signal; and transmission means for transmitting said level-controlled speech signal to a communication partner, wherein said control signal generation means comprises:
   a movable contact connected to a ground terminal;
   a rotor, connected to said movable contact, being adapted to turn in response to a rotating motion of said hinge;
   a plurality of fixed contacts each coming into contact with said movable contact at a time;
   a plurality of resistors having different resistance values and each having a first end connected to a respective one of said fixed contacts;
   a common resistor having a first end connected commonly to a second end of each of said resistors;
   a reference voltage terminal, connected to a second end of said common resistor, being supplied with a reference voltage; and
   an analog-to-digital converter for receiving a voltage of said first end of said common resistor and for converting the received voltage into a digital signal, and for producing said control signal.

2. A speech control apparatus having an upper casing, a lower casing and a hinge, said control apparatus comprising:

a microphone, disposed in said lower casing, for converting a user's speech into a speech signal;

reception means for receiving a radio signal from a communication partner of said user, and for delivering a reception signal;

control signal generation means for detecting a rotating angle of said hinge, and for producing a control signal indicative of the hinge rotating angle;

echo suppression means for suppressing, in accordance with said control signal and said reception signal, an echo included in said speech signal, and for delivering an echo-cancelled speech signal; and transmission means for transmitting said echo-cancelled speech signal to said communication partner.

3. The speech control apparatus as claimed in claim 2, wherein said echo suppression means comprises:

a coefficient selector for storing a plurality of predetermined echo path tracing factors and for delivering one of said predetermined echo path tracing factors by being addressed by said control signal;

an adaptive controller for producing, in accordance with said predetermined echo path tracing factor from said coefficient selector, an echo replica modification signal for modification of an echo replica;

an echo replica generator for generating an echo replica modified by said echo replica modification signal; and a subtracter for subtracting the echo replica from said speech signal.

4. The speech control apparatus as claimed in claim 3, wherein said coefficient selector stores said plurality of predetermined echo path tracing factors which are inversely proportional to the rotating angle of said hinge.

5. The speech control apparatus as claimed in claim 2, wherein said control signal generation means comprises:

a movable contact connected to a ground terminal;

a rotor, connected to said movable contact, being adapted to turn in response to a rotating motion of said hinge;

a plurality of fixed contacts each for coming into contact with said movable contact at a time;

a plurality of resistors having different resistance values and each having a first end connected to respective ones of said fixed contacts;

a common resistor having a first end connected commonly to a second end of each of said resistors;

a reference voltage terminal, connected to a second end of said common resistor, being supplied with a reference voltage; and an analog-to-digital converter for receiving a voltage of said first end of said common resistor and for converting the received voltage into a digital signal, and for producing said control signal.

* * * * *